United States Patent
Courtot

[11] 3,874,710
[45] Apr. 1, 1975

[54] TUBING MANIFOLD COUPLING

[75] Inventor: Louis B. Courtot, Euclid, Ohio

[73] Assignee: The Weatherhead Company, Cleveland, Ohio

[22] Filed: Nov. 2, 1972

[21] Appl. No.: 303,242

[52] U.S. Cl....... 285/137 R, 285/286, 285/DIG. 15, 403/14, 403/186, 403/263, 403/271
[51] Int. Cl............................................. F16l 39/00
[58] Field of Search .......... 285/26, 29, 61, DIG. 15, 285/286, 189, 137 R, 150; 165/153, 158, 173, 178; 403/13, 14, 186, 263, 230, 244, 270, 271, 272; 29/471.1, 471.3, 475, 482; 52/758 B, 758 D, 667, 669; 182/228

[56] References Cited
UNITED STATES PATENTS
| | | | |
|---|---|---|---|
| 2,475,468 | 7/1949 | Andrews | 285/137 R |
| 2,786,417 | 3/1957 | Lung | 285/137 R |
| 3,092,845 | 6/1963 | Mustee | 285/137 R |
| 3,560,027 | 2/1971 | Graham | 285/305 |

Primary Examiner—Werner H. Schroeder
Assistant Examiner—Conrad L. Berman
Attorney, Agent, or Firm—McNenny, Farrington, Pearne & Gordon

[57] ABSTRACT

A manifold coupling assembly for mounting one or more tubes in fluid communication with a mating coupling member is disclosed. The assembly includes a C-shaped channel section having a thin web section extending between spaced side rails which project from one face of the web section. One or more apertures are pierced or punched through the web section and a tube is mounted in each aperture by brazing or soldering the tube thereto. The tube is also brazed or soldered to adjacent portions of the side rails so that the tube is restrained from movement in planes normal to and aligned with the longitudinal axis of the channel section. According to one aspect of the invention, the C-shaped channel section is extruded so that the spaced side rails have diverging faces. Portions of the apertures are defined by and formed in the faces which more securely retain and mechanically lock the tubes. According to another aspect of this invention, the apertures are pierced or punched in a flat strip and the strip is then formed to its C-shaped cross section. These operations may be performed sequentially by progressive die techniques.

14 Claims, 7 Drawing Figures 3,874,710
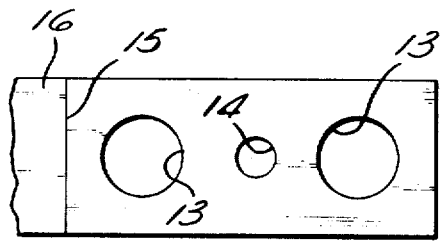
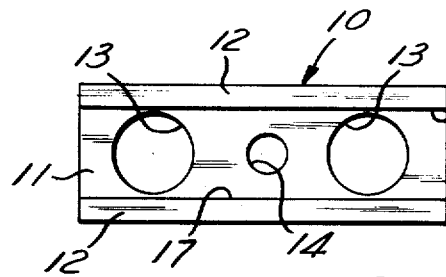
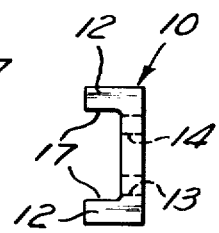
Fig.1   Fig.2   Fig.3
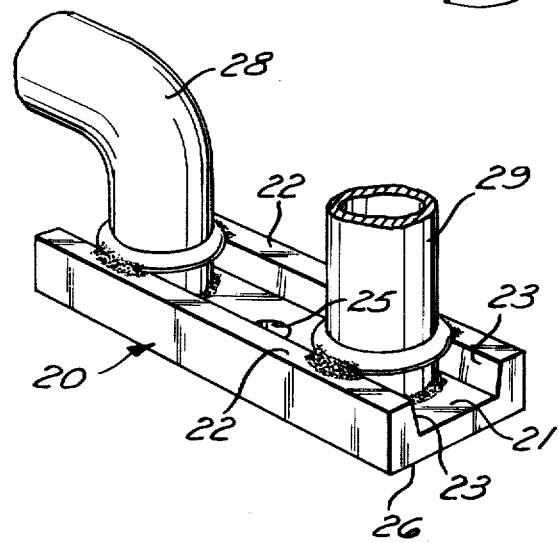
Fig.4
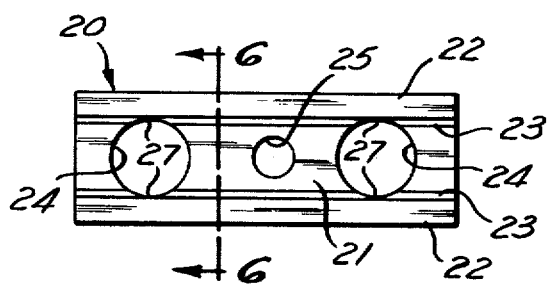
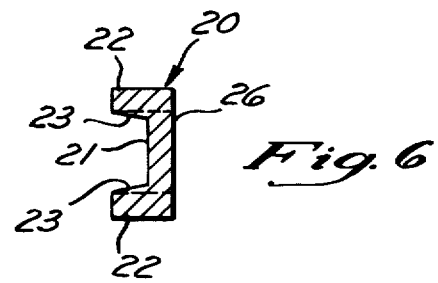
Fig.5   Fig.6
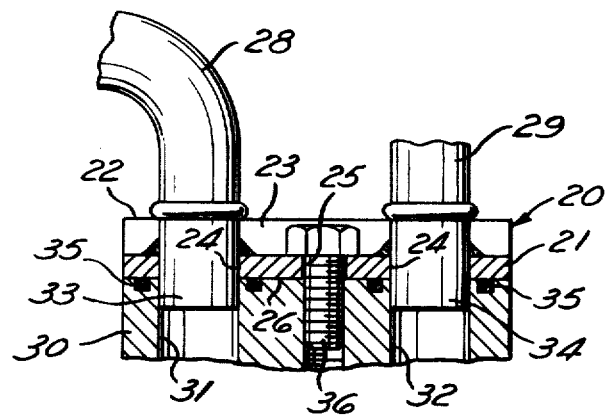
Fig.7

3,874,710

TUBING MANIFOLD COUPLING

BACKGROUND OF THE INVENTION

This invention relates to manifold couplings for mounting tubes in fluid communication with a mating coupling member. Typically, and for example, the mating coupling member comprises a portion of an air conditioner compressor or evaporator. One face of the manifold coupling or the mating face of the other coupling member is provided with suitable seals which surround the tubes. According to prior art practices, such coupling members include a manifold coupling formed from a relatively thick, flat plate having apertures formed therein. Since the plate is relatively thick, the apertures must be formed by drilling techniques as opposed to relatively inexpensive piercing or punching operations.

SUMMARY OF THE INVENTION

This invention provides a manifold coupling having a thin web section in which apertures may be formed by stamping or punching operations rather than by expensive drilling techniques. The manifold coupling according to this invention comprises a C-shaped channel section which minimizes the amount of material employed while having tube holding characteristics comparable to a relatively thick, flat plate.

According to this invention, the C-shaped channel includes side rails which project from an apertured web section and which are substantially tangent to the apertures so that a brazed or soldered connection between the tube and the apertures and between the tube and the side rails holds the tube against movement in planes normal to and aligned with the longitudinal axis of the channel section.

According to one aspect of this invention, the channel section is formed by a progressive die operation wherein a flat strip is punched to form the required number of apertures therein and is partially severed from the remainder of the strip stock. At another die station, the strip is press formed into its C-shaped cross section and completely severed from the remainder of the stock.

According to another aspect of this invention, the C-shaped channel section is formed by extrusion and the apertures are pierced or punched from the flat side of the section. The side rails are formed so that opposed faces diverge from a connecting web section and the punching operation cuts away part of the opposed faces to partially form the aperture therein. According to this aspect of the invention, the tube is more securely retained by the channel section in that the cut-away portions of the opposed faces mechanically lock the tube in place in addition to the brazed or soldered connection.

In certain installations where each tube is to mate only with its own predetermined port in another mating member, an arrangement is provided to insure this predetermined registry. According to this optional feature of the invention, the tubes extend through and beyond the web section, and a mounting bolt is non-symmetrically arranged with respect to the tubes so that the tubes may be mounted only in a predetermined position relative to the mating ports.

BRIEF DESCRIPTION OF THE DRAWING

FIG. 1 is a plan view of a manifold coupling according to this invention, showing the coupling in an intermediate stage of its formation by progressive die techniques.

FIG. 2 is a plan view of a manifold coupling according to this invention, showing the coupling of FIG. 1 severed from the remainder of the strip stock and completely formed into a C-shaped channel.

FIG. 3 is an end view of the coupling shown in FIG. 2.

FIG. 4 is a perspective view of a coupling according to a further aspect of this invention, showing tubes assembled thereto.

FIG. 5 is a plan view of the coupling shown in FIG. 4, with the tubes removed for clarity.

FIG. 6 is a cross sectional view, the plane of the section being indicated by the line 6—6 in FIG. 5.

FIG. 7 is a cross sectional view of the coupling illustrated in FIGS. 4 through 6, showing the coupling and its tubes in cooperating engagement with another mating member.

DETAILED DESCRIPTION OF THE INVENTION

Referring now to the drawings, and particularly to the embodiment illustrated in FIGS. 1 through 3, a C-shaped channel section 10 is illustrated. The channel section 10 has a thin web section 11 extending between spaced side rails 12 which project from one face of the web section. Circular apertures 13 and a mounting aperture 14 are pierced or punched through the web section 11.

According to this aspect of the invention, the C-shaped channel section may be formed by progressive die techniques from relatively thin, flat strip stock. As is illustrated in FIG. 1, one die station may punch the apertures 13 and 14 in the stock and partially sever the apertured portion of the stock along a line 15 from the remainder of the stock 16. At a subsequent station, the side rails 12 are formed, the web section 11 is defined, and the channel section is completely severed along the line 15.

It may be noted that areas of opposed faces 17 of the side rails 12 are substantially adjacent to the apertures 13. Thus, when tubes (not shown in FIGS. 1 through 3) are soldered or brazed in the apertures 13, some of the brazing or soldering material will securely fasten the tubes to the channel section 10. Thus, the tubes are securely retained against movement in a plane transverse to the longitudinal axis of the section 10 by the side rails 12 and are restrained against movement in the direction of the longitudinal axis of the section 10 by the brazed or soldered connection around the apertures 13 and between the tubes and the side rails 12.

Referring now to the embodiment illustrated in FIGS. 4 through 6, a manifold coupling assembly is illustrated. The assembly includes a C-shaped channel section 20 having a thin web section 21 extending between spaced side rails 22. The C-shaped channel section 20 is formed by an extrusion technique and opposed planar faces 23 of the side rails 22 diverge outwardly from the web section 21, as may be seen most clearly in FIG. 6. After the section 20 is extruded, it is cut to a desired length and tube receiving apertures 24 and a mounting aperture 25 are pierced or punched through the web portion 21 from a flat sealing face 26 of the section 20. As may be seen in FIGS. 5 and 6, the diameter of the apertures 24 is such that arcuate areas 27 are sliced from the diverging faces 23 during the aperture punching operation. These arcuate areas mechanically lock tubes 28 and 29 in place and those tubes are securely held, by the mechanical lock and by brazing or soldering, against movement in planes normal to and aligned with the longitudinal axis of the channel section 20.

It may be noted that the apertures 24 and the apertures 13 are not equidistantly spaced from the mounting apertures 25 and 14, respectively. This optional feature may be employed in certain installations where tubes mounted in those apertures are intended to register only with certain ports in another mating member to form a complete coupling. With the tubes extending through the apertures 13 and through the apertures 24 to a position beyond the mating face of the channel sections 10 and 20, the channel sections may only be mounted in a predetermined position relative to mating ports in the other cooperating member.

This arrangement is illustrated in FIG. 7, wherein the manifold coupling assembly set forth in FIGS. 4 through 6 is shown in cooperating relationship with another mating member 30. The member 30 has ports 31 and 32 which respectively mate with projecting end portions 33 and 34 of the tubes 28 and 29. Each tube 28 and 29 is sealed relative to its port by O-rings 35 provided in the mating face of the member 30. The apertures 24 are not equidistantly spaced from the mounting aperture 25 so that a bolt 36 extending through the aperture 25 may mount the tubes only in the illustrated predetermined position.

Although a specific embodiment of the invention has been shown and described in detail, various modifications and rearrangements may be made without departing from the scope of the invention defined by the following claims.

What is claimed is:

1. A manifold coupling for mounting one or more tubes in fluid communication with a mating coupling member, comprising a C-shaped channel section having a thin web section extending between spaced side rails which project and diverge from one face of said web section, at least one circular aperture through said web with opposed faces of said side rails being substantially adjacent to said aperture, said aperture being partially formed in said faces.

2. A manifold coupling assembly according to claim 1, wherein at least two circular apertures are provided and a mounting aperture is provided in said web section.

3. A manifold coupling assembly according to claim 2, wherein said mounting aperture is non-equidistantly spaced from said circular apertures.

4. A manifold coupling according to claim 1, wherein said C-shaped channel section is an extrusion.

5. A manifold coupling according to claim 1, wherein said C-shaped channel section is a stamping.

6. A manifold coupling assembly mounting one or more tubes in fluid communication with a mating coupling member, comprising a C-shaped channel section having a thin web section extending between spaced side rails which project from one face of said web section, at least one circular aperture through said web with opposed faces of said side rails being substantially adjacent to said aperture, a tube mounted in each aperture, and means joining said tube to adjacent faces of said side rails to prevent movement in planes normal to and aligned with the longitudinal axis of said channel section and to prevent rotation of said tube about its axis.

7. A manifold coupling assembly according to claim 6, wherein said opposed faces are substantially parallel to each other and are substantially tangent to said aperture.

8. A manifold coupling assembly according to claim 6, wherein said aperture is partially formed in said opposed faces to thereby lock said tube against movement in planes normal to and aligned with the longitudinal axis of said channel section.

9. A manifold coupling assembly according to claim 6, wherein said opposed faces diverge from said base and wherein said aperture is partially formed in said opposed faces to thereby mechanically lock said tube against movement in planes normal to and aligned with the longitudinal axis of said channel section.

10. A manifold coupling assembly according to claim 6, wherein said C-shaped channel section is an extrusion.

11. A manifold coupling assembly according to claim 6, wherein said C-shaped channel section is a stamping.

12. A manifold coupling assembly according to claim 6, wherein at least two circular apertures are provided and a mounting aperture is provided in said web section.

13. A manifold coupling assembly according to claim 12, wherein said mounting aperture is non-equidistantly spaced from said circular apertures.

14. A manifold coupling assembly according to claim 13, wherein said tubes extend through said circular apertures and beyond one face of said channel section.

* * * * *